United States Patent [19] [11] 3,764,550
Block et al. [45] Oct. 9, 1973

[54] PROCESS FOR THE FORMATION OF METAL CARBIDE AND METAL CARBIDE PLUS CARBON MICROSPHERES

[75] Inventors: Jacob Block, Rockville, Md.; Robert Donald Shoup, Painted Post, N.Y.; Norman Raymond Laine; Leonard Vincent Triggiani, both of Rockville, Md.

[73] Assignee: W. R. Grace & Co., New York, N.Y.

[22] Filed: June 9, 1969

[21] Appl. No.: 831,710

[52] U.S. Cl............ 252/301.1 R, 264/0.5, 423/256, 423/440
[51] Int. Cl............................................. C01g 43/00
[58] Field of Search ............................. 252/301.1 R; 264/0.5; 23/208, 349

[56] References Cited
UNITED STATES PATENTS

| | | | |
|---|---|---|---|
| 2,697,028 | 12/1954 | Baker et al. | 423/449 X |
| 3,403,008 | 9/1968 | Hamling | 264/0.5 X |
| 3,334,050 | 8/1967 | Grotenhuis et al. | 252/301.1 |
| 3,438,749 | 4/1969 | Lonadier et al. | 264/0.5 X |
| 3,252,916 | 5/1966 | Wilson et al. | 252/301.1 |

OTHER PUBLICATIONS

Helfferich, Ion Exchange, 1962, pp. 100–104.

Dowex: Ion Exchange, 1964, pp. 15–17, 21, 23, 68.

*Primary Examiner*—Carl D. Quarforth
*Assistant Examiner*—R. L. Tate
*Attorney*—Joseph P. Nigon and Kenneth E. Prince

[57] ABSTRACT

A process for preparing metal carbide and metal carbide plus carbon microspheres by controlled decomposition of ion exchange resin beads that contain metals followed by conversion to the metal carbide or metal carbide plus carbon.

7 Claims, No Drawings

PROCESS FOR THE FORMATION OF METAL CARBIDE AND METAL CARBIDE PLUS CARBON MICROSPHERES

Ion exchange resins are commercially available in two forms. The cation exchange resins have exchange activities associated with aromatic sulfonic, methylene sulfonic, carboxylic acid, phosphonic acid, and phenolic groups. One of the most common of these resins is prepared by sulfonation of synthetic organic base materials. A high capacity aromatic sulfonic acid cation resin has been prepared by sulfonation of a polymer, prepared from a mixture of styrene and divinylbenzene, with sulfuric acid. Preparation of these styrene-divinylbenzene beads and the final sulfonated product are described in detail in the literature.

Another type of cation exchange resin is the carboxylic acid type. There are prepared by the reaction of phenol, acrolein, and the semi amide of oxalic acid. They may also be prepared directly by copolymerization of either methacrylic or acrylic acid with divinylbenzene.

The anion exchange resins are generally formed by the polymerization of an aromatic amine and formaldehyde or a polyamine of phenol and formaldehyde. One of the earlier anion exchange resins was prepared from M-phenylene diamine, polyethylene diamine, and formaldehyde.

A series of resins of varying basicities and porosities may be prepared from an intermediate prepared by the chloromethylation and subsequent amination of the copolymer styrene and divinylbenzene with varying degrees of crosslinking. These materials are well known commercially available products. They are discussed at great length in the book, "Ion Exchange Resins," by Robert Kunin, John Wiley & Sons, 1958.

This book lists more than 200 cation and anion exchange resins by trade name and gives the type of resin and the capacity of the resin. The trade names assigned to seven of the more typical resins are set out in the table below:

CATION EXCHANGE RESINS

| Name | Type |
|---|---|
| Amberlite IRC-120 | Aromatic sulfonic (styrene base) |
| Amberlite IRC-50 | Carboxylic (acrylic) |
| Dowex 50 | Aromatic sulfonic (styrene base) |
| Dowex 30 | Sulfonated phenolic |

ANION EXCHANGE RESINS

| Name | Type |
|---|---|
| Amberlite IRA-400 | Quaternary strong base (styrene) |
| Dowex 1 | Quaternary strong base (styrene) |
| Dowex 2 | Quaternary strong base (styrene) |

The ion exchange resins have achieved wide acceptance in industry. They are widely used in the refining of sugar, the preparation of certain drugs, in water treatments and other areas where ion exchange is important.

We have found that spherical ion exchange resins can be used to prepare metal carbides and metal carbides plus excess carbon microspheres which have a uniform and controlled composition, high density, and a size within a carefully controlled range. In our novel process, the exchange functionality of spherical ion exchange resins is used to homogeneously load the resins with metal ions. The metal loaded resins are dried and thermally decomposed to give metal carbide microspheres. The amount of metal exchanged into the resin microspheres is the main determining factor in the composition of the final product. The amount of exchange can be controlled up to the maximum capacity of the resin by controlling the amount of metal ion in the solution in contact with the resin. Thermal decomposition of the resin microspheres gives a reproducible carbon loss.

The first step of our novel process is the selection of a suitable resin. Cation exchange resins and anion exchange resins both give satisfactory results. When the sulfonated cation exchange resins are used, means must be provided for removing sulfur from the microsphere product. The carboxylic acid resins do not have this problem since there is no sulfur in the resin structure. Anion exchange resins can also be used in preparing certain types of carbides. The anion exchange resin can be exchanged with a suitable anion such as tungstate, for example, and the resin used as a matrix for preparing the carbide.

After the most desirable resin is selected, it is treated with a solution of metal ions. Solutions of metal ions such as titanium, zirconium, hafnium, niobium, molybdenum, tantalum, tungsten, osmium, and thallium may be used for this purpose. The only limitation in the choice of a metal is that it be somewhat soluble and ionizable. Chlorides, nitrates, sulfates, etc. give satisfactory results. Our process is essentially an exchange process and water is the preferred solvent. However, in some systems, organic solvents such as methanol, for example, give very good results.

The solution can be varied so that it contains an infinitely dilute or a saturated solution of metal ion. The concentration of the salt solution, of course, depends on the salt being used and the solvent chosen for the preparation. When uranium nitrate hexahydrate was used, for example, the solution had a concentration of 37 grams per liter. When sodium tungstate was exchanged with an anion exchange resin, 50 grams of the salt were dissolved in 3 liters of deionized water to prepare the exchange solution. Another variable is the pH of the system during the exchange step. The exchange can be carried out at any pH that is compatible with the resin and the metal ion.

After the resin is exchanged with a suitable quantity of the desired metal solution, it is washed free of excess solution and dried using any suitable technique. We have found good results are obtained when the exchange resin is dried at a temperature of about 50°–185°C. for a period of about 8 to 24 hours.

The next step of the process is conversion to the carbide. In a typical run, the resin was dried at 100°C. and the spheres heated slowly in argon to a temperature of 1500°C. Heating for 1 hour at 300°C. followed by one hour at 500°C. and then long periods, on the order of about 15–28 hours, at 1500°C. is typical.

The amount of sulfur in the product can be decreased during the conversion step. In a typical example, sulfur was decreased from 7.5 weight percent to about 3.2 weight percent while the spheres were heated at 600°–1300°C. The conversion to the carbides is carried out preferably in an inert gas such as argon. During a conversion of the exchanged resin beads to the carbide, the beads underwent a weight loss of from about 30% for uranium, for example, to about 70 percent for titanium. No significant disfiguration of the resin beads or cracking of the beads was observed. The spheres decreased in size about 40% during the conversion to the carbides.

The final step of our process is the sintering step. The sintering is critically important if the product is to have the desired physical properties. The product recovered from our novel process is characterized by a high density. The density is achieved by careful control of the sintering step.

The sintering is normally carried out in the presence of hydrogen or an inert gas such as argon, for example, or in vacuum. Temperatures used range from 1500° to 3000° C. Sulfur content after sintering is generally less than 0.5%.

The carbide particles recovered are generally spherical and the average diameter D can be calculated with good accuracy. This can be confirmed directly by microscopic examination. For spherical smooth surface spheres of uniform structure, D is dependent on size and $D_s$ as measured from the surface will be similar or very close in value. A comparison of D and $D_s$ values of a sample readily indicates the presence of any undesirable irregular structure. The structural factor sigma, expressed below, has been used to evaluate the structural irregularities to indicate the limit desired and expected from the spheres as for a comparison with existing materials. Sigma $\sigma$ as equal to $D/D_s$ the sigma value determined on samples of our products was about one. Accuracies of these measurements was on the order of ± 10 percent.

The spherical particles recovered from our process generally have an unsintered density of from 25–50 percent of theoretical with values of 30–40 percent being more usual. They are sintered to densities of 30–80 percent theoretical at temperatures of about 2000°C.

Our invention is further illustrated by the following specific but non-limiting examples.

EXAMPLE 1

The effect of sintering on the carbon content, metal content, and sulfur content of hafnium loaded spheres was determined in a series of runs. The spheres (15 lbs of Dowex 50WX4) in the 100–200 mesh size range and in the hydrogen form, were suspended in 16.8 liters of deionized water. A total of 2423 grams of hafnyl chloride ($HfOCl_2 \cdot 8H_2O$) was added. The mixture was stirred for 24 hours. The resin was filtered and washed free of chloride with deionized water. The resin was then vacuum dried at 100°C. Several small samples, approximately 2 grams each, of this material were heated in argon at varying temperatures for varying periods of time generally about 1 hour. Decomposition of the carbides was monitored by weight loss. The maximum weight loss (about 30–35 percent) occurred above 900°C. The resulting hafnium carbide plus carbon microspheres decreased in size from 100 micron resin spheres to about 80 micron spheres. The resin beads charred with essentially no agglomeration or deterioration of the surface or shape of the beads. The sulfur content decreased from 7.53 weight percent when the resin was heated at 600°C. for one hour at 3.2 weight percent when the resin was heated to 1300°C. for one hour. The density of the material sintered at a temperature of 1200°C. was 2.4 grams per cubic centimeter. The data collected in this series is set out in the table below:

TABLE I

| Run No. | Temperature in °C. | Time in hrs. | Density in g/cc | Analysis in wt. percent | | | Molecular formula |
|---|---|---|---|---|---|---|---|
| | | | | Carbon | Hafnium | Sulfur | |
| 1 | 600 | 1 | | 45.1 | 35.24 | 7.53 | $HfC_{19}$ |
| 2 | 800 | 1 | | 45.27 | 38.36 | 7.53 | $HfC_{17.6}$ |
| 3 | 900 | 1 | 2.5 | | | | |
| 4 | 1100 | 1 | | 43.49 | 38.65 | 4.50 | $HfC_{16.7}$ |
| 5 | 1200 | 1 | 2.4 | | | | |
| 6 | 1300 | 1 | | 44.26 | 39.60 | 3.20 | $HfC_{16.3}$ |

It is apparent from these data that sintering to higher temperatures decreases the sulfur content of the hafnium carbide product. By increasing the temperature from 600–1300, the weight percent sulfur in the product was decreased from 7.53 to 3.20.

EXAMPLE 2

This example illustrates the preparation of uranium exchanged resin microspheres.

In this run, 100 grams of sulfonic acid ion exchange resin in the hydrogen form (Dowex 50W-X4), 200–400 mesh size range, was rinsed three times with dilute hydrochloric acid. A solution was made up by dissolving 37 grams of $UO_2(NO_3)_2 \cdot 6H_2O$ in a liter of water. The mixture was stirred for 22 hours and an additional 3.5 grams of $UO_2(NO_3)_2 \cdot 6H_2O$ were added. The mixture was stirred for two additional hours. The resin spheres were then filtered and washed with deionized water. The pH of the solution dropped from 2.05 to 0.75. The spheres were dried and analyzed and found to contain 33 percent carbon and 24.7 percent uranium (as $UO_2$).

EXAMPLE 3

This example illustrates the preparation of titanium exchanged resin microspheres.

Sixty-six grams of a sulfonic acid ion-exchange resin (Amberlite IR 120) in the hydrogen form in the 30–50 mesh size range was washed three times with dilute hydrochloric acid, three times with water, and once with water adjusted to a pH of 0.7 with hydrochloric acid. A titanium solution was prepared by adding 3.0–3.5 ml of $TiCl_4$ dropwise with stirring to 1 liter of cold dilute hydrochloric acid solution (pH 0.8–1.0). The resin and the solution were then stirred for several hours. The solution was then decanted, and a fresh solution prepared as described above was added. This was repeated for 6 additional times or until no more titanium was taken up by the resin as determined by residue analysis on small samples. The resin was then filtered and washed with deionized water. The resin was dried at 105°C. and found to contain 39.6 percent carbon and 18.9 percent titanium (as $TiO_2$).

EXAMPLE 4

This is another example illustrating the preparation of titanium exchanged resin microspheres.

To 1790 grams of acid washed Dowex 50W-X4 resin, 200–400 mesh, H+ form, 65.8 percent $H_2O$, was added 8.1 liter of deionized water. Then 500 ml. of $TiCl_4$ was added dropwise with vigorous stirring to the resin-water mixture. The mixture was stirred for 24 hours, then the resin was filtered off, washed free of chloride, and dried at 145°C. Analysis of the resin showed a $TiO_2$ content of 21.82 percent.

EXAMPLE 5

This example shows the preparation of tungsten exchanged resin microspheres. An 80 gram portion of an anion exchange resin (Dowex 2-X8), 50–100 mesh, in the chloride form was washed several times with deionized water. A solution was prepared by dissolving 50 grams of $Na_2WO_4 \cdot 2H_2O$ in three liters of deionized water. This solution was mixed with the resin and the mixture stirred for 150 minutes. The liquid was decanted and 3 liters of fresh solution containing 50 grams of the salt was added. The mixture was stirred for 165 minutes. The resin was then removed by filtration and washed free of chloride with deionized water. A sample was dried at 100°C. and washed at 700°C. (to prevent volatilization of tungsten). The residue contained 22.4 percent tungsten (as $WO_3$). The carbon content of the spheres was 34.9 percent.

EXAMPLE 6

This example illustrates the preparation of the metal exchanged resins using methanol as a solvent.

Twenty-one grams of a carboxylic acid ion exchange resin (Amberlite IRC-50) in hydrogen form in the 20–50 mesh size range was washed several times with absolute methanol. A hafnium solution was prepared by dissolving 69 grams of $HfOClhd\ 2 \cdot 8H_2O$ in 370 ml of absolute methanol. The resin was added to the hafnium solution and the mixture was allowed to react for 20 hours. The solution was decanted and the procedure was repeated three times with fresh solution. The reaction time was 20 hours. The resin was filtered off, washed with absolute methanol until chloride free, and then dried at 100°C. The spheres were found to contain 26.6 percent carbon and 26.3 percent hafnium as $HfO_2$.

EXAMPLE 7

In this example, the products prepared as described above were converted to the carbides. Each of the products prepared in Examples 2–5 were calcined in an argon atmosphere. The resin was heated to a temperature of 300°C. for one hour. The temp. was increased to 460°C. for one hour and to 900°C. for one hour and increased to 1500°C. and maintained at that temperature for 15 hours. The uranium carbide formed had a composition of $UC_{22.7}$ and a density of 2.14 grams per cc. The resin had a weight loss of 33 percent during decomposition. The resulting spheres were excellent in sphericity and surface texture. The titanium spheres of Example 3 lost 70 percent of their weight during decomposition. There was no evidence of agglomeration of the spheres. The final composition of $TiC_{10.5}$. A density of 1.50 g/cc was achieved after heating at 1500°C. (55 percent of theoretical). The tungsten carbide product of Example 5 had a composition of $WC_{11.3}$ and a density of 2.44 g/cc (51 percent of theoretical). The resin lost 70 percent of its weight during decomposition. There was no disfiguration of the microspheres.

EXAMPLE 8

This example illustrates the preparation of the carbide using a carboxylic acid resin.

A total of 21 grams of a carboxylic acid resin (Amberlite IRC-50) in the hydrogen form and in the 20–50 mesh size range were washed several times with absolute methanol. A hafnium solution was prepared by dissolving 69 grams of hafnyl chloride ($HfOCl_2 \cdot 8H_2$) in 370 ml of absolute methanol. The resin was added to the hafnium solution and the mixture was allowed to react for 18 hours. The solution was decanted and a fresh solution of the same concentration was added, and allowed to react for 20 hours. The solution was decanted, and the procedure was repeated for a third time with a fresh solution and reacted with the resin for 20 hours. The resin was filtered off, washed with absolute methanol until chloride free and dried at 100°C. The spheres were analyzed and found to contain 26.6 percent carbon and 26.3 percent hafnium as $HfO_2$. The particles were converted to the carbides by heating the spheres that had been dried to 100°C. in argon for one hour at 300°C., one hour at 500°C., one-half hour at 900°C. and 15 hours at 1500°C. The charred microspheres showed no agglomeration. The spheres decreased in size during decomposition from 326 to 180 microns. The spheres had a density of 3.15 grams per cc after being calcined at 900°C. After calcination at 1500°C., the hafnium carbide had the formula $HfC_{1.95}$ and a density of 2.85 grams per cc (33 percent theoretical). An x-ray analysis of the product showed no hafnium oxide, only the hafnium carbide phase was observed. Metallographic examination revealed a continuous carbon network in the product.

Obviously, many modifications and variations of the invention may be made without departing from the essence and scope thereof and only such limitations should be applied as are indicated in the appended claims.

What is claimed is:

1. A process for preparing metal carbide microspheres having densities of 50 to 80 percent of theoretical by controlled decomposition of carbonaceous ion exchange resin microspheres selected from the group consisting of sulfonic acid type cation exchange resins, carboxylic acid type cation exchange resins and quaternary ammonium type anion exchange resins which comprises the steps of:
   a. Contacting said spheres with a solution of a salt of a metal selected from the group consisting of the chlorides, nitrates, or sulfates, of metals selected from the group consisting of zirconium, hafnium, titaniun, tungsten, niobium, tantalum and uranium and mixtures thereof at a pH compatible with the resin and the metal ion, until the desired ion exchange is achieved.
   b. Drying said spheres by heating to about 50° to 185°C for about 8 to 24 hours,
   c. Heating to temperatures of 1500°C to 2000°C for about 15 to 28 hours in vacuum, an atmosphere of hydrogen or an inert gas to convert the metal to carbide,
   d. Sintering in vacuum, an atmosphere of hydrogen or an inert gas at a temperature of about 2000°C to 3000°C for about 15 to 28 hours to densify the spheres,
   e. Recovering the product metal carbide microsphere.

2. The process according to claim 1 wherein the carbonaceous microspheres are exchanged with an aqueous hafnyl chloride solution.

3. The process according to claim 1 wherein the carbonaceous microspheres are exchanged with an aqueous uranyl nitrate solution.

4. The process according to claim 1 wherein the carbonaceous microspheres are exchanged with an aqueous titanium chloride solution.

5. The process according to claim 1 wherein the carbonaceous microspheres are anion exchange resins and are exchanged with aqueous tungstate solutions.

6. The process according to claim 1 wherein the solvent used to prepare the metal solution is methanol.

7. The process according to claim 1 wherein the metal carbide microspheres contain an excess of carbon.

* * * * *